United States Patent
Ramsay

(10) Patent No.: US 11,181,662 B2
(45) Date of Patent: Nov. 23, 2021

(54) STATIC EARTH MODEL GRID CELL SCALING AND PROPERTY RE-SAMPLING METHODS AND SYSTEMS

(71) Applicant: LANDMARK GRAPHICS CORPORATION, Houston, TX (US)

(72) Inventor: Travis St. George Ramsay, Rosenberg, TX (US)

(73) Assignee: LANDMARK GRAPHICS CORPORATION, Houston, TX (US)

(*) Notice: Subject to any disclaimer, the term of this patent is extended or adjusted under 35 U.S.C. 154(b) by 1421 days.

(21) Appl. No.: 14/913,983

(22) PCT Filed: Aug. 28, 2013

(86) PCT No.: PCT/US2013/057110
§ 371 (c)(1),
(2) Date: Feb. 23, 2016

(87) PCT Pub. No.: WO2015/030754
PCT Pub. Date: Mar. 5, 2015

(65) Prior Publication Data
US 2016/0231462 A1  Aug. 11, 2016

(51) Int. Cl.
*G01V 99/00* (2009.01)
*G06F 17/11* (2006.01)

(52) U.S. Cl.
CPC ............ *G01V 99/005* (2013.01); *G06F 17/11* (2013.01)

(58) Field of Classification Search
CPC .............................. G01V 99/005; G06F 17/11
USPC ............................................................. 703/2
See application file for complete search history.

(56) References Cited

U.S. PATENT DOCUMENTS

| 6,549,879 | B1 | 4/2003 | Cullick et al. |
| 7,096,122 | B2 | 8/2006 | Han |
| 2005/0234690 | A1 | 10/2005 | Mainguy et al. |
| 2010/0057418 | A1* | 3/2010 | Li ........................... E21B 47/00 703/10 |
| 2013/0035913 | A1* | 2/2013 | Mishev ............... G06F 17/5018 703/2 |

(Continued)

FOREIGN PATENT DOCUMENTS

WO   2015/030754   3/2015

OTHER PUBLICATIONS

PCT International Search Report and Written Opinion, dated Mar. 13, 2014, Appl No. PCT/US2013/57110, "Static Earth Model Grid Cell Scaling and Property Re-Sampling Methods and Systems," Filed Aug. 28, 2013, 13 pgs.

(Continued)

*Primary Examiner* — Saif A Alhija
(74) *Attorney, Agent, or Firm* — Gilliam IP PLLC

(57) ABSTRACT

At least some of the disclosed systems and methods obtain a static earth model having a three-dimensional grid with multiple cells, each cell having petrophysical properties associated therewith. Further, at least some of the disclosed systems and methods adjust a size of at least some of the cells based on a predetermined scaling rule. Further, at least some of the disclosed systems and methods re-sample petrophysical properties for the adjusted grid cells. If the one or more attributes of the static earth model are within a threshold tolerance after the adjusting and re-sampling steps, the static earth model is used as input to a flow simulator.

19 Claims, 5 Drawing Sheets

(56) References Cited

U.S. PATENT DOCUMENTS

2013/0073268 A1* 3/2013 Abacioglu .......... E21B 41/0092
  703/2
2013/0338984 A1 12/2013 Braaksma et al.

OTHER PUBLICATIONS

Australian Application Serial No. 2013399193, First Examination Report dated Oct. 4, 2016, 3 pages.
British Application Serial No. 1601420.1, First Examination Report dated Sep. 2, 2016, 4 pages.
British Application Serial No. 1601420.1, Second Examination Report dated Jan. 13, 2017, 2 pages.
Canadian Application Serial No. 2,919,633, Office Action dated Nov. 28, 2016, 3 pages.
Singapore Application Serial No. 11201600639R, Search Report and Written Opinion dated Jul. 25, 2016, 6 pages.
Canadian Application Serial No. 2,919,633; Examiner's Letter; dated Oct. 19, 2018, 4 pages.

* cited by examiner

STATIC EARTH MODEL GRID CELL SCALING AND PROPERTY RE-SAMPLING METHODS AND SYSTEMS

BACKGROUND

Modern oil field operators demand a great quantity of information relating to the parameters and conditions encountered downhole. Among the types of information most sought is porosity and permeability, i.e., the ability of a fluid (usually oil, water, gas, etc.) to flow through a geologic formation. The permeability of a reservoir is a function of the interconnectedness of the available pore space, as well as, pore size distribution, flow direction, grain size and sorting, shale content, non-connecting vugs, and fractures. To facilitate characterizing and simulating formation behavior, geologic grids are employed, in which grid cells (blocks) of the geologic grid are assigned values for formation parameters such as porosity, permeability, and/or others. As the size of grid cells decreases in size, grid computations become more complex and time-consuming. On the other hand, as the size of grid cells increases, grid computations become more simplistic and are less likely to accurately represent downhole conditions. Determining an appropriate grid cell size is not a trivial task.

BRIEF DESCRIPTION OF THE DRAWINGS

A better understanding of the various disclosed embodiments can be obtained when the following detailed description is considered in conjunction with the attached drawings, in which.

Figure 1:
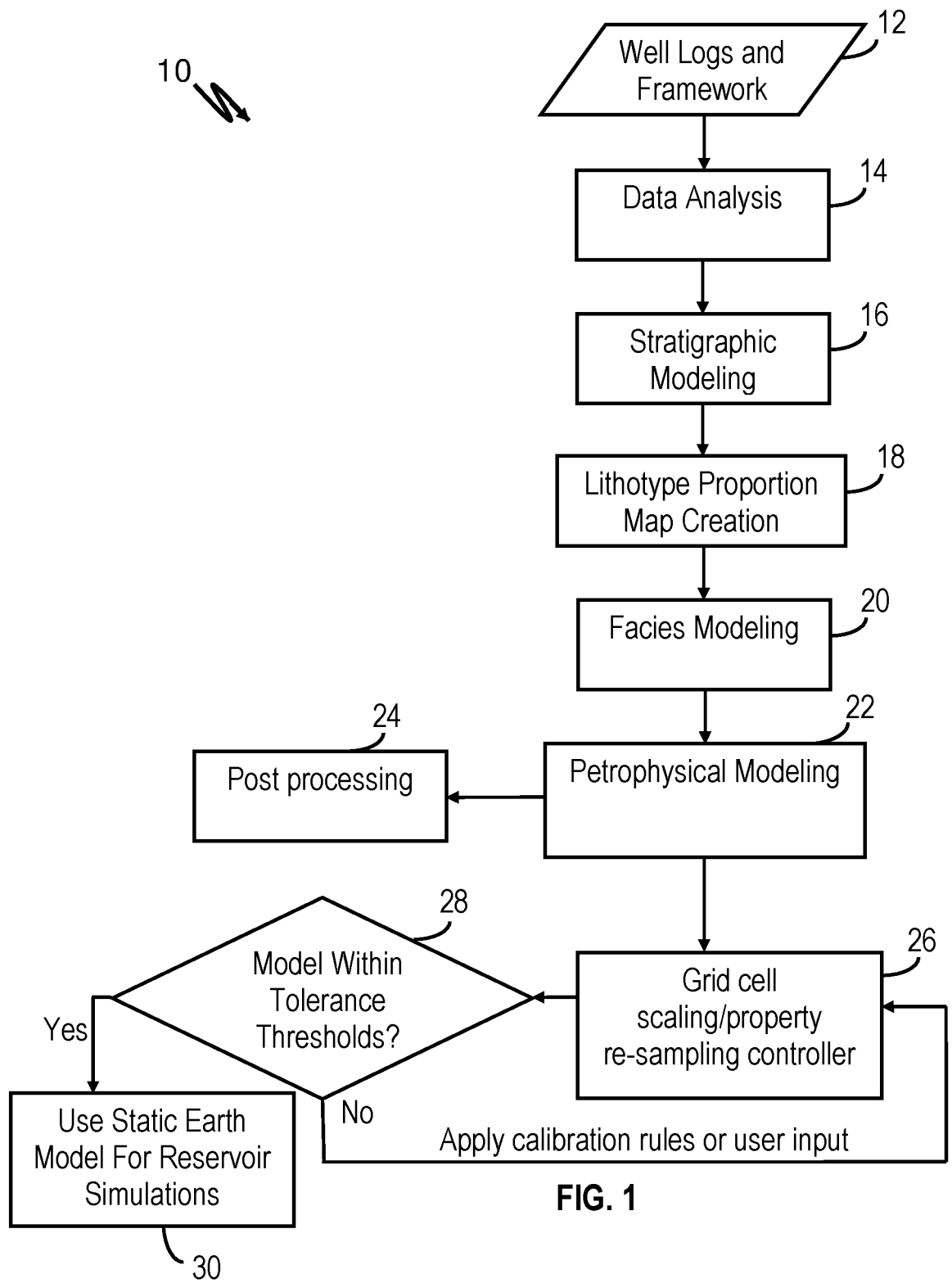
FIG. 1 shows an illustrative process for determining a static earth model.

It should be understood that the drawings and detailed description are not intended to limit the disclosed embodiments to the particular forms shown, but on the contrary, the intention is to cover all modifications, equivalents and alternatives falling within the scope of the appended claims.

DETAILED DESCRIPTION

Hydrocarbon production monitoring or planning involves the collection of measured data from within and around the wells of a reservoir. Such data may include, but is not limited to, water saturation, water and oil cuts, fluid pressure and fluid flow rates. As the data is collected, it is archived into a historical database. The collected data, however, mostly reflects conditions immediately around the reservoir wells. To provide a more complete picture of the state of a reservoir, simulations are executed that model the overall behavior of the entire reservoir based on the collected data, both current and historical. These simulations predict the reservoir's overall current state, producing simulated data values both near and at a distance from the wellbores.

The accuracy of reservoir simulation results is limited by the static earth model depicting the subsurface formation as well as various other inputs such as rock-fluid descriptions and pressure-volume-temperature characterizations. To facilitate characterizing and simulating reservoir behavior, static earth models employ geologic grids, where grid cells of the geologic grid are assigned the same geological parameter value (e.g., porosity and permeability values). In accordance with at least some embodiments, the disclosed methods and systems determine a static earth model using a grid cell scaling process, in which predetermined rules determine the amount of scaling that is applied to at least some of the grid cells of a static earth model. After the scaling process is complete, the static earth model may be assessed to determine its accuracy relative to the pre-scaled version. For example, in some embodiments, the post-scaled static earth model is assessed by comparing pre-scaled and post-scaled values for static property connectivity, tortuosity, Euler number, streamline simulation, and/or full-filed reservoir simulation. If needed, geologic feature adjustments (lithotype proportion maps, facies relationships, distribution of petrophysical properties within a defined depositional facies) and/or grid scaling adjustments (upscaling or downscaling) are made to the static earth model until the assessment results indicate that attributes of the post-scaled static earth model are accurate to within a threshold tolerance level and that further scaling is detrimental to the integrity of the geology and/or production history associated with the model. The resulting static earth model can then be used for ongoing operations such as fluid flow simulations.

As used herein "tortuosity" refers to a ratio computed as an arc length to straight line distance through a medium in the direction of macroscopic flow. The computation of tortuosity may be performed statically, using petrophysical properties defined as a connected geobody and/or dynamically using streamlines. The difference in tortuosity between homogeneous and heterogeneous cases (for both static and dynamic models) indicate the possible effects of rock property heterogeneity, which produce a divergence in the flow path, and/or multiphase flow effects in the dynamic model (e.g., fluid retention due to wettability or isolation due to capillarity). Also, changes in tortuosity may be determined by comparing histograms of tortuosity for respective static and dynamic models to those computed from a given petrophysical realization or post-process streamline bundle.

If needed, geologic feature adjustments (lithotype proportions, facies relationships, distribution of petrophysical properties within a defined depositional facies) and/or grid scaling adjustments (upscaling or downscaling) are made to the static earth model until the assessment results indicate that attributes of the post-scaled static earth model are accurate to within a threshold tolerance level and that a scaling limit has been reached. The resulting static earth model can then be used for ongoing operations such as fluid flow simulations.

FIG. 1 shows an illustrative process 10 for determining a static earth model. The process includes a data analysis block 14 that receives well log input from block 12. The well logs correspond to collected data that may include, but is not limited to, porosity, permeability, resistivity, and gamma ray. Here data quality is assessed and outliers are removed such that spurious data is not introduced into the developed model. Block 12 also provides a framework, which corresponds to structural rules for a static earth model based on framework interpretation and knowledge of the depositional environment. The stratigraphic modeling block 16 uses the framework to build a geocellular grid that honors the internal bedding geometries resulting from sedimentation.

At lithotype proportion map creation block 18, a lithotype proportion map that defines grouped proportion curves and/or smoothed lithotype proportions. The generated lithotype proportion map is provided to a facies modeling block 20 that generates one or more depositional facies models (e.g., based on stochastic simulation methods), which may be used as a template for the mathematical distribution of petrophysical properties within a reservoir or formation. For example, in process 10, the one or more facies models are input to a petrophysical modeling block 22, which mathematically distributes petrophysical properties within a static earth model using spatial constraints of the one or more facies models.

In at least some embodiments, the petrophysical features are input to a post processing block 24 that estimates volumetric characteristic such as original oil in place, gross rock volume, and recoverable hydrocarbon. The post processing block 24 also may quantify static property uncertainty characteristics and may execute a single-phase fluid numerical simulation in the static earth model in order to assess the effect of the distributed petrophysical properties and the spatial constraints resulting from the depositional facies.

The petrophysical features also are input to a grid cell scaling/property re-sampling controller block 26 that determines the grid cells sizes for each of a plurality of grid cells, and assigns petrophysical property values (e.g., porosity and permeability values) for each grid cell. In at least some embodiments, the grid cell scaling controller block 26 determines the degree of scaling based on predetermined rules, including: 1) an amount of matrix grid (ROOT) cells required; 2) an amount of local grid refinement (LGR) necessary to properly describe geologic features and unconformities; 3) a degree of static tortuosity due to input petrophysical properties; 4) a degree of static tortuosity due to input depositional facies properties; 5) a degree of dynamic tortuosity for a fluid saturation volume resulting from a single phase flow model execution; 6) a degree of dynamic tortuosity for a fluid saturation volume resulting from a multi-phase flow model execution; and/or 7) a minimization of relative error in Euler Number.

More specifically, for rule 1, the maximum number of scaled cells that are desired for a flow simulation model can be indicated. For rule 2, the maximum amount of LGR necessary to properly describe geologic in the flow simulation model can be indicated. For rule 3, a combination of petrophysical property filtering is applied. First, the tortuosity for a pseudo grid volume which has homogeneous property values is computed in all active, geometrically and petrophysically relevant cells. The tortuosity (e.g., histograms) of this homogeneous pseudo grid volume represents the effects of over-scaling on the intended grid, and is compared with the original (pre-scaled/re-sampled) grid as well as each successive attempt at scaling. Grid tortuosity approaching the homogeneous pseudo grid volume tortuosity indicates excessive data smearing due to scaling/re-sampling. Thus, the user specified condition for rule 3 may be to honor the tortuosity distribution computed for the pre-scaled grid within an indicated tolerance level. With rule 3, rock property continuity is preserved for selected ranges of petrophysical properties when the tortuosity of the range of petrophysical properties is maintained across varying degrees of upscaling.

For rule 4, a combination of petrophysical property filtering is applied as in rule 3. However, rule 4 incorporates deposition facies as the target property for computing tortuosity. With rule 4, spatial continuity is preserved when the tortuosity of the depositional facies is maintained across varying degrees of upscaling.

For rule 5, a single phase approximation for fluid flow modeling is used, such as is available in DecisionSpace Earth Modeling, to compute streamlines for the original (pre-scaled) grid. Also, single phase flow streamlines for a pseudo-grid (the original grid but with homogeneous rock properties specified) are computed. The single-phase flow streamlines provide a baseline for determining excessive upscaling. The dynamic tortuosity is determined by computing tortuosity of the generated streamlines such that successive iterations of upscaling produce coincident distributions of tortuosity between streamline distributions computed for the pre-scaled grid and the homogenous volume. The user-specified condition for rule 5 would be to honor the tortuosity distribution computed for the pre-scaled grid within an indicated tolerance level.

For rule 6, a multi-phase approximation for fluid flow modeling is used, such as is available in DecisionSpace® Nexus, to compute streamlines for the original (pre-scaled) grid. Also, multi-phase flow streamlines for a pseudo-grid (the original grid but with homogeneous rock properties specified) are computed. The multi-phase flow streamlines provide a baseline for determining excessive upscaling. The dynamic tortuosity is determined by computing tortuosity of the generated streamlines such that sequential iterations of upscaling produce coincident distributions of tortuosity between streamline distributions computed for the pre-scaled grid and the homogenous grid volume. Multi-phase flow modeling in the grid provides a description of dynamic fluid property effects in the reservoir model. The user-specified condition for rule 6 would be to honor the tortuosity distribution computed for the pre-scaled grid within an indicated tolerance level.

For rule 7, the Euler Number (normalized by volume) for the pre-scaled grid is computed based on a predefined property filter and connectivity criterion; creating a single or multiple characteristic geobodies that are representative of hydraulic flow units (or production zones) in the reservoir. The Euler Number criteria that is applied in the scaling process is designated, and corresponds to a pre-scaled grid Euler Number plus an epsilon (deviation) term. Subsequently, the Euler Number (normalized by volume) for each scaled grid is computed. The applied scaling should have minimum degree of computed grid scaling and should honor the Euler Number criterion from the pre-scaled grid.

In at least some embodiments, the scaling process is combined with a validation procedure, in which an initial history match run (i.e., without any modifications to grid transmissibilities) is performed to verify whether flow rates and cumulative produced fluid volumes can be matched. Thus, an automated scaling process can be combined with industry workflows for determining the type and degree of scaling to be performed. Further, in at least some embodiments, software tools (e.g., DecisionSpace® Earth Modeling "See-It-Now" capability) may be employed a priori as a part of project planning between the geo-modeler and the reservoir engineer. The use of such software tools would allow the geo-modeler and reservoir engineer to investigate the degree of scaling in a subset of the grid in which all full-field data is honored before the full-field static earth model is applied to a project.

Once an iteration of scaling and property re-sampling is complete, a determination is made regarding whether attributes of the static earth model are within a tolerance threshold at block 28. For example, the tolerance threshold may be based on pre-scaled values for connectivity, tortuosity, and/or Euler number. In such case, the determination of block 28 may involve comparing post-scaled values for connectivity, tortuosity, and/or Euler number with corresponding pre-scaled values. If attributes of the scaled static earth model are within the tolerance threshold (determination block 28), then the model is applied to reservoir simulations or other operations at block 30. Otherwise, the process 10 returns to block 26, where calibration rules and/or user input are applied to update the static earth model. As an example, the calibration rules and/or user input may adjust the grid cell scaling (upscaling or downscaling) of the static earth model using predetermined connectivity, tortuosity, and/or Euler number values for the next iteration of scaling. Further, the calibration rules and/or user input may adjust lithotype proportions, facies relationships, distribution of petrophysical properties within a defined depositional facies, or other geological features of the static earth model. The process of adjusting the grid scale and/or otherwise adjusting the static earth model may continue until attributes of the static earth model are determined to be within a tolerance threshold.

Figure 2:
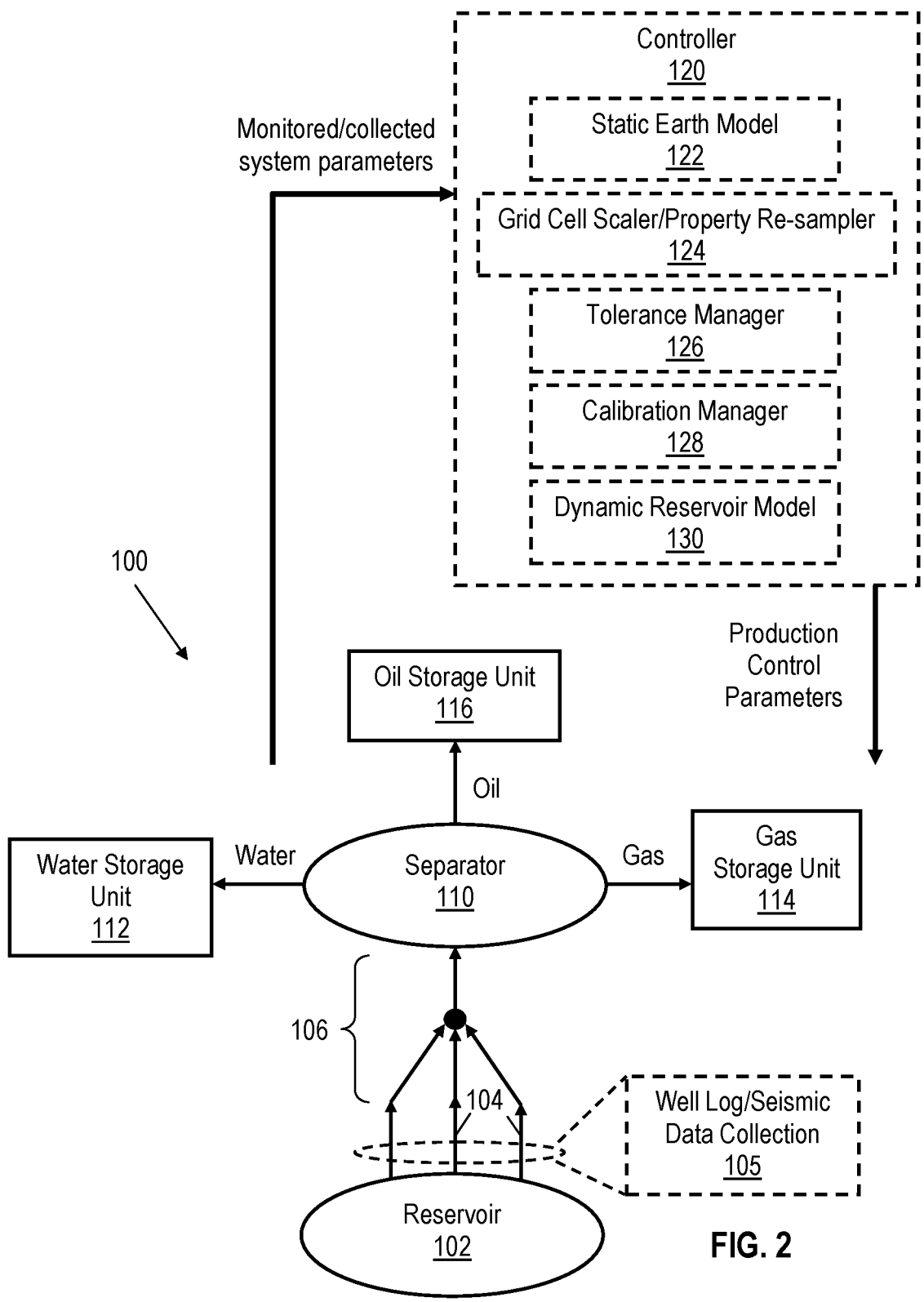
FIG. 2 shows an illustrative hydrocarbon production system.

FIG. 2 shows an illustrative hydrocarbon production system 100. The illustrated hydrocarbon production system 100 includes a plurality of wells 104 extending from a reservoir 102, where the arrows representing the wells 104 show the direction of fluid flow (i.e., wells 104 represent production wells). Although only production wells are shown, hydrocarbon production system 100 could also include injector wells. Further, the hydrocarbon production system 100 also includes well log and seismic data collection 105 at wells 104.

In FIG. 2, a surface network 106 transports fluid from the wells 104 to a separator 110, which directs water, oil, and gas to separate storage units 112, 114, and 116. The water storage unit 112 may direct collected water back to reservoir 102 or elsewhere. The gas storage unit 114 may direct collected gas back to reservoir 102, to a gas lift interface (not shown), or elsewhere. The oil storage unit 116 may direct collected oil to one or more refineries. In different embodiments, the separator 110 and storage units 112, 114, and 116 may be part of a single facility or part of multiple facilities associated with the hydrocarbon production system model 100. Although only one oil storage unit 116 is shown, it should be understood that multiple oil storage units may be used in the hydrocarbon production system 100. Similarly, multiple water storage units and/or multiple gas storage units may be used in the hydrocarbon production system 100.

In FIG. 2, the hydrocarbon production system 100 includes a controller 120 with various components related to the disclosed methods and systems. The controller 120 represents, for example, one or more computers executing software or other instructions. As shown, the controller 120 receives monitored system parameters from various components of the hydrocarbon production system 100, and determines various production control parameters for the hydrocarbon production system 100. It should be understood that some operations of the controller 120 may be automated, while others involve operator input and/or the accumulation of data or simulation results over time. Further, some operations of controller 120 may be based on a combination of software-based analysis and operator input over a long period of time. Rather than provide information on all the possible control operations of hydrocarbon production system 100, the discussion of controller 120 is limited to its use of various components related to the static earth model grid scaling techniques described herein. One of ordinary skill in the art would understand that the controller 120 may also perform various other operations in real-time and/or in a time-segmented manner.

In accordance with at least some embodiments, the controller 120 comprises a static earth model 122 determined using, for example, one or more of the steps described for process 10 of FIG. 1. The static earth model 122 includes stratigraphic, facies, and petrophysical features as described herein. As shown, the controller 120 also includes a grid cell scaler/property re-sampler 124 that scales grid cells of the static earth model 122 and assigns petrophysical property values to the scaled grid cells as described herein (see e.g., the operations of grid cell scaling/property re-sampling controller 26 in FIG. 1). The controller 120 also includes a tolerance manager 126 that determines whether attributes of the scaled static earth model are within tolerance thresholds as described herein. For example, the tolerance manager 126 may compare connectivity, tortuosity, and/or Euler number values for the scaled static earth model with predetermined (e.g., pre-scaled) connectivity, tortuosity, and/or Euler number values. If the post-scaled attributes of the static earth model 122 are not within tolerance, calibration manager 128 enables updates to the static earth model 122 based on predetermined tolerance values, calibration rules, and/or a calibration interface. As needed, grid cell upscaling or downscaling is performed using the calibration manager 128 until attributes of the static earth model are within the tolerance threshold levels maintained by the tolerance manager 126.

As shown, the controller 120 also includes a dynamic reservoir model 130. In at least some embodiments, the static earth model 122 and the dynamic reservoir model 130 are employed to perform fluid flow simulations and/or history matching operations. For example, fluid flow simulation operations may employ a fully implicit method (FIM) that simulates fluid flow using Newton's method to solve a non-linear system of equations. Other methods of modeling reservoir simulation (e.g., the IMPES only method) are also contemplated herein. In the history matching process, the production rates and cumulative produced fluids are simulated using the static earth model 122 as input and are compared with historical production data from the field (e.g., historical data from wells in production within the reservoir and/or individual wells corresponding to the field). The grid cell scaling and/or petrophysical properties of the static earth model 122 may then be updated/adjusted in order to obtain a match of simulated results with respect to measured historical data. The need to make adjustments to the petrophysical properties during the history matching process would become diminished as static earth model updates are made (considering the geologic characterization of measured data in the formation as opposed to produced volumes of fluid).

Figure 3:
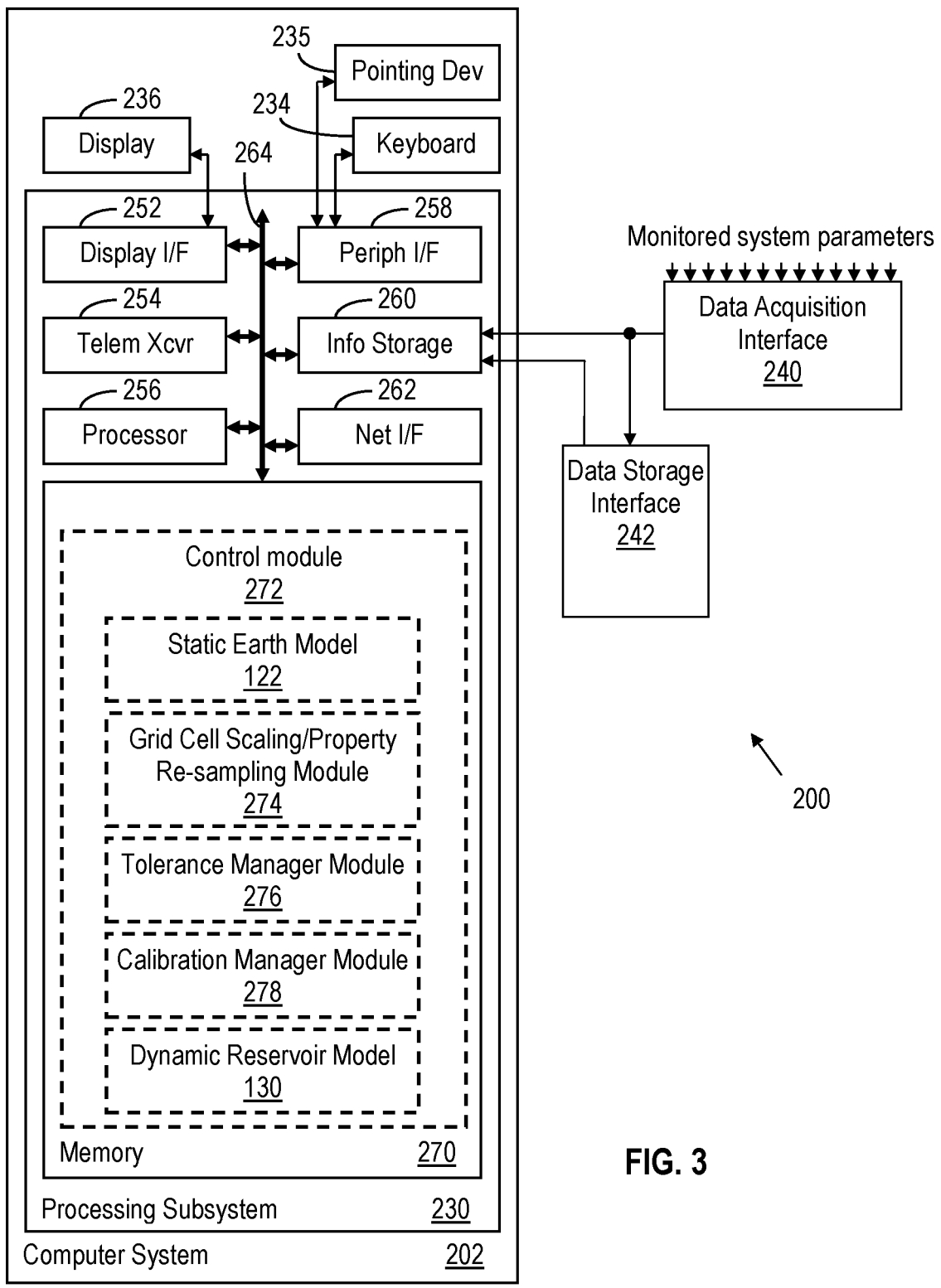
FIG. 3 shows illustrative components for a control system.

FIG. 3 shows illustrative components for a control system 200 that carries out the operations of controller 120. The illustrated components include a computer system 202 coupled to a data acquisition interface 240 and a data storage interface 242. In at least some embodiments, a user is able to interact with computer system 202 via keyboard 234 and pointing device 235 (e.g., a mouse) to perform the grid cell scaling and static earth model assessment operations described herein.

As shown, the computer system 202 comprises includes a processing subsystem 230 with a display interface 252, a telemetry transceiver 254, a processor 256, a peripheral interface 258, an information storage device 260, a network interface 262 and a memory 270. Bus 264 couples each of these elements to each other and transports their communications. In some embodiments, telemetry transceiver 254 enables the processing subsystem 230 to communicate with downhole and/or surface devices (either directly or indirectly), and network interface 262 enables communications with other systems (e.g., a central data processing facility via the Internet). In accordance with embodiments, user input received via pointing device 235, keyboard 234, and/or peripheral interface 258 are utilized by processor 256 to perform the grid cell scaling and static earth model assessment operations described herein. Further, instructions/data from memory 270, information storage device 260, and/or data storage interface 242 are utilized by processor 256 to perform the grid cell scaling and static earth model assessment operations described herein.

As shown, the memory 270 comprises a control module 272. More specifically, the control module 272 includes static earth model 122, which may be obtained using, for example, one or more of the steps described for process 10 of FIG. 1. The control module 272 also includes a grid cell scaling/property re-sampling module 274 that performs grid cell scaling operations and petrophysical property re-sampling as described herein. The control module 272 also includes tolerance manager module 276 to assess whether attributes (e.g., connectivity, tortuosity, and/or Euler number values) for the scaled static earth model 122 are within a tolerance threshold. Meanwhile, calibration manager module 278 of the control module 272 enables updates to the static earth model 122 based on predetermined tolerance values, calibration rules, and/or a calibration interface. Further, the control module 272 may employ dynamic reservoir model 130 to perform fluid flow simulations and/or history matching operations as described herein.

In at least some embodiments, the control module 272, when executed, causes the computer system 202 to perform various steps including: 1) obtaining a static earth model having a three-dimensional grid with multiple cells, each cell having petrophysical properties associated therewith; 2) adjusting a size of at least some of the cells based on a predetermined scaling rule; 3) re-sampling petrophysical properties for the adjusted grid cells; 4) determining attributes of the static earth model after the adjustment; and 5) if the determined attributes of the static earth model are within a threshold tolerance after steps 2 and 3, using the static earth model as input to a flow simulator.

More specifically, in some embodiments, the control module 272, when executed, causes the computer system 202 to adjust a size of at least some of the cells using a predetermined scaling rule that defines a maximum amount of scaled cells for the static earth model grid or a maximum amount of LGR for the static earth model grid. Further, the control module 272, when executed, may cause the computer system 202 to adjust a size of at least some of the cells using a predetermined scaling rule that defines a static tortuosity distribution limit for the static earth model grid based on a pre-scaled tortuosity distribution for the grid. Further, the control module 272, when executed, may cause the computer system 202 to adjust a size of at least some of the cells using a predetermined scaling rule that defines a static tortuosity distribution limit for the static earth model grid based on pre-scaled tortuosity distribution for the grid that applies deposition facies as a target property for computing tortuosity.

Further, the control module 272, when executed, may cause the computer system 202 to adjust a size of at least some of the cells using a predetermined scaling rule that defines a dynamic tortuosity distribution limit for the static earth model grid based on a pre-scaled tortuosity distribution computed using single-phase flow streamlines. Further, the control module 272, when executed, may cause the computer system 202 to adjust a size of at least some of the cells using a predetermined scaling rule that defines a dynamic tortuosity distribution limit for the static earth model grid based on a pre-scaled tortuosity distribution computed using multi-phase flow streamlines. Further, the control module 272, when executed, may cause the computer system 202 to adjust a size of at least some of the cells using a predetermined scaling rule that defines a Euler Number error threshold for the static earth model grid based on pre-scaled Euler Number criterion.

In some embodiments, the control module 272 corresponds to non-transitory computer-readable medium with software that, when executed, causes the computer system 202 to scale at least some of the cells and their petrophysical properties by applying a predetermined scaling rule that defines a maximum amount of scaled cells for the grid or a maximum amount of LGR for the grid. Further, the control module 272 may correspond to non-transitory computer-readable medium with software that, when executed, causes the computer system 202 to scale at least some of the cells and their petrophysical properties by applying a scaling rule that verifies a distribution of static tortuosity for the post-scaled static earth model based on a homogeneous model and a pre-scaled static tortuosity distribution. Further, the control module 272 may correspond to non-transitory computer-readable medium with software that, when executed, causes the computer system 202 to scale at least some of the cells and their petrophyscial properties by applying a scaling rule that that verifies a distribution of dynamic tortuosity for the post-scaled static earth model based on a homogeneous model and a pre-scaled dynamic tortuosity distribution. Further, the control module 272 may correspond to non-transitory computer-readable medium with software that, when executed, causes the computer system 202 to scale at least some of the cells and their petrophysical properties by applying a scaling rule that verifies a Euler number error threshold based on a Euler number computed for geobodies in the post-scaled static earth model and a Euler number computed for the pre-scaled static earth model. Although the various modules 272, 274, 276, 278, 280, and 282 are described as software modules executable by a processor (e.g., processor 256), it should be understood that comparable operations may be performed by programmable hardware modules, application-specific integrated circuits (ASICs), or other hardware.

The disclosed grid cell scaling and static earth model assessment operations may be combined with other production system management operations, where expense and time management are needed. The systems and methods described herein rely in part on measured data collected from production system components such as fluid storage units, surface network components, and wells, such as those found in hydrocarbon production fields. Such fields generally include multiple producer wells that provide access to the reservoir fluids underground. Further, controllable production system components and/or EOR components are generally implemented at each well to throttle up or down the production as needed based on predetermined control criterion. Further, in at least some illustrative embodiments, additional well data is collected using production logging tools to supplement data collected from other sensing/monitoring operations. The production logging tool data may be communicated to a computer system during the logging process, or alternatively may be downloaded from the production logging tool after the tool assembly is retrieved.

Figure 4:
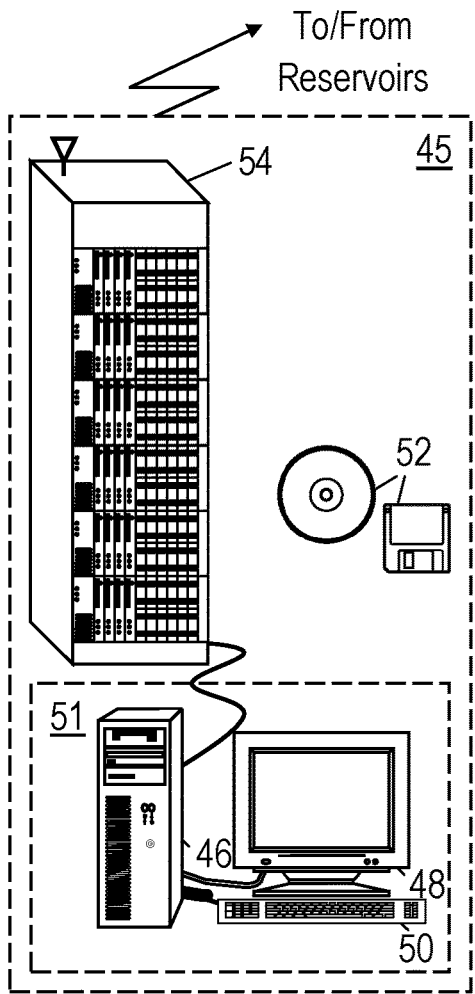
FIG. 4 shows illustrative computer system to control data collection and production.

FIG. 4 shows an example computer system to control data collection and production. In some embodiments, measured well data is periodically sampled and collected from the producer well and combined with measurements from other wells within a reservoir, enabling the overall state of the reservoir to be monitored and assessed. Such wells may forward collected data from the downhole measurement devices and forwards it to a supervisory control and data acquisition (SCADA) system that is part of a processing system such as computer system 45 of FIG. 4. In the illustrative embodiment shown, computer system 45 includes a blade server-based computer system 54 that includes several processor blades, at least some of which provide the above-described SCADA functionality. Other processor blades may be used to implement the disclosed static earth model determination and calibration systems and methods. Computer system 45 also includes user workstation 51, which includes a general purpose processor 46. Both the processor blades of blade server 54 and general purpose processor 46 are preferably configured by software, shown in FIG. 4 in the form of removable, non-transitory (i.e., non-volatile) information storage media 52, to process collected well data within the reservoirs and data from a gathering network (described below) that couples to each well and transfers product extracted from the reservoirs. The software may also include downloadable software accessed through a communication network (e.g., via the Internet). General purpose processor 46 couples to a display device 48 and a user-input device 50 to enable a human operator to interact with the system software 52. Alternatively, display device 48 and user-input device 50 may couple to a processing blade within blade server 54 that operates as general purpose processor 46 of user workstation 51.

Figure 5:
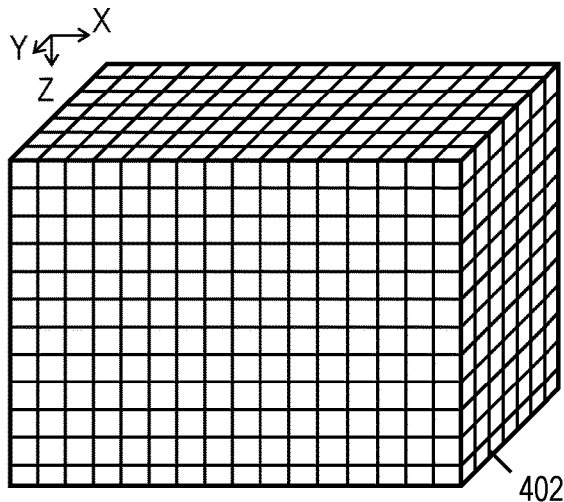
FIG. 5 shows an illustrative data volume in three dimensions.

The static earth model determination, grid cell scaling, grid property re-sampling and assessment techniques described herein can be related to a three dimensional array of data values. Such data values may correspond to collected survey data, scaling data, simulation data, and/or other values. Collected survey data, scaling data, and/or simulation data is of little use when maintained in a raw data format. Hence collected data, scaling data, and/or simulation data is sometimes processed to create a data volume, i.e., a three dimensional array of data values such as the data volume 402 of FIG. 5. The data volume 402 represents a distribution of formation characteristics throughout the survey region. The three-dimensional array comprises uniformly-sized cells, each cell having data values representing one or more formation characteristics for that cell. Examples of suitable formation characteristics include porosity, permeability, and density. Further, stratigraphic features, facies features, and petrophysical features may be applied to the three-dimensional array to represent a static earth model as described herein. The volumetric data format readily lends itself to computational analysis and visual rendering, and for this reason, the data volume 402 may be termed a "three-dimensional image" of the survey region. In some embodiments, the data volume 402 or another grid may be displayed to convey grid cell scaling result information and/or property re-sampling result information.

Figure 6:
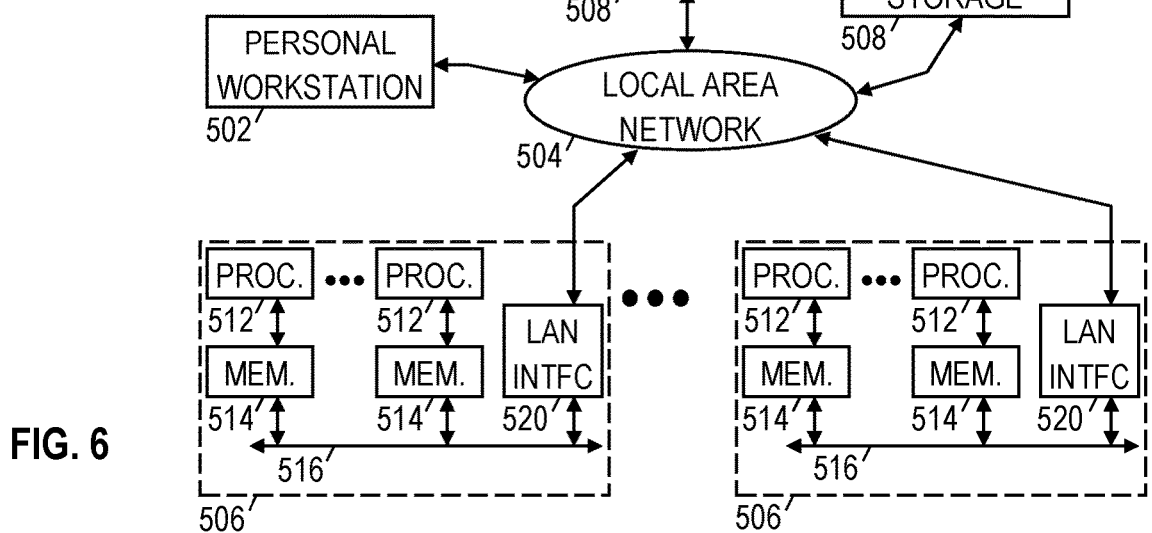
FIG. 6 shows an illustrative imaging system.

FIG. 6 shows an illustrative imaging system for determining and displaying a static earth model, scaling results, re-sampling results, simulation results, or related data. In FIG. 6, a personal workstation 502 is coupled via a local area network (LAN) 504 to one or more multi-processor computers 506, which are in turn coupled via the LAN to one or more shared storage units 508. Personal workstation 502 serves as a user interface to the processing system, enabling a user to load survey data, static earth model data, scaling data, and/or simulation data into the system, to retrieve and view image data from the system, and to configure and monitor the operation of the processing system. Personal workstation 502 may take the form of a desktop computer with a graphical display that graphically shows survey data, static earth model data, scaling data, and/or simulation data and images of a corresponding region. Personal workstation 502 also may include input devices (e.g., a keyboard and mouse) that enable the user to move files, execute processing software, and select/input options or commands.

LAN 504 provides high-speed communication between multi-processor computers 506 and with personal workstation 502. The LAN 504 may take the form of an Ethernet network. Meanwhile, multi-processor computer(s) 506 provide parallel processing capability to enable suitably prompt conversion of static earth model data, raw data signals, scaling data, or simulation data into a region image. Each computer 506 includes multiple processors 512, distributed memory 514, an internal bus 516, and a LAN interface 520. Each processor 512 operates on an allocated portion of the input data to produce a partial image of the model region. Associated with each processor 512 is a distributed memory module 514 that stores conversion software and a working data set for the processor's use. Internal bus 516 provides inter-processor communication and communication to the LAN networks via interface 520. Communication between processors in different computers 506 can be provided by LAN 504.

Shared storage units 508 may be large, stand-alone information storage units that employ magnetic disk media for nonvolatile data storage. To improve data access speed and reliability, the shared storage units 508 may be configured as a redundant disk array. Shared storage units 508 initially store a data volume such as data volume 402. The matrix values and/or image volumes can be stored on shared storage units 508 for later processing. In response to a request from the workstation 502, the image volume data can be retrieved by computers 506 and supplied to workstation 502 for conversion to a graphical image to be displayed to a user.

Figure 7:
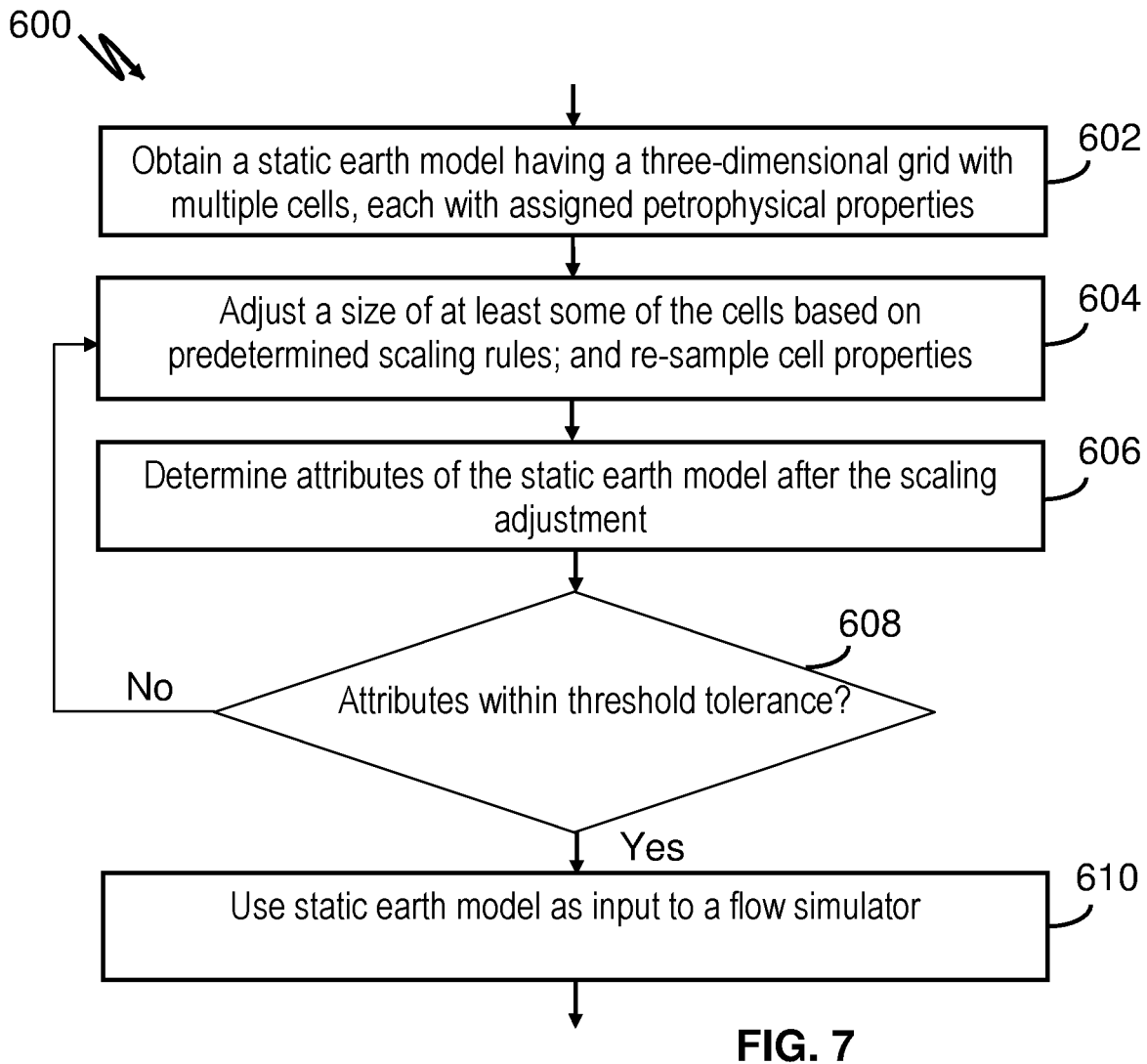
FIG. 7 shows an illustrative grid cell scaling and property re-sampling method.

FIG. 7 shows an illustrative grid cell scaling and property re-sampling method 600. The method 600 may be performed, for example, by controller 120 of FIG. 2, computer system 202 of FIG. 3, computer system 45 of FIG. 4C, or computers 502 and/or 506 of FIG. 6. As shown, the method 600 includes obtaining a static earth model having a three-dimensional grid with multiple cells at block 602, where each of the cells has assigned petrophysical properties. At block 604, a size of at least some of the cells is iteratively adjusted to satisfy one or more predetermined scaling rules. As a result of the re-sizing of the grid cells, the properties assigned to those cells are re-sampled. For example, in at least some embodiments, the predetermined scaling rule defines a maximum number of matrix grid cells for the grid. Additionally or alternatively, the predetermined scaling rule defines an amount of LGR for the grid. Additionally or alternatively, the predetermined scaling rule minimizes a relative Euler Number error for the grid. Additionally or alternatively, the predetermined scaling rule defines a degree of static tortuosity for the grid. Additionally or alternatively, the predetermined scaling rule defines a degree of dynamic tortuosity for the grid. The dynamic tortuosity used for scaling operations may be based on a single-phase flow model or a multi-phase flow model.

At block 606, attributes of the static earth model after the grid cell scaling process is performed are determined. For example, the attributes may correspond to connectivity, tortuosity, and/or Euler number values as described herein. If the attributes of the static earth model after scaling are within a threshold tolerance (determination block 608), the static earth model is used as input to a flow simulator (e.g., to predict fluid flow in a reservoir) at block 610. Otherwise, the method 600 returns to block 604, where the size of at least some of the grid cells are adjusted (or re-adjusted), and where re-sampling of cell properties is performed.

Numerous other modifications, equivalents, and alternatives will become apparent to those skilled in the art once the above disclosure is fully appreciated. For example, although at least some software embodiments have been described as including modules performing specific functions, other embodiments may include software modules that combine the functions of the modules described herein. Also, it is anticipated that as computer system performance increases, it may be possible in the future to implement the above-described software-based embodiments using much smaller hardware, making it possible to perform the described static earth model determination and grid cell scaling operations using on-site systems (e.g., systems operated within a well-logging truck located at the reservoir). Additionally, although at least some elements of the embodiments of the present disclosure are described within the context of monitoring real-time data, systems that use previously recorded data (e.g., "data playback" systems) and/or simulated data (e.g., training simulators) are also within the scope of the disclosure. It is intended that the following claims be interpreted to embrace all such modifications, equivalents, and alternatives where applicable.

What is claimed is:

1. A method, comprising:
   obtaining a static earth model having a three-dimensional grid with multiple cells, each cell having petrophysical properties associated therewith;
   adjusting a size of at least some of the multiple cells based on a predetermined scaling rule in which pressure forces on a fluid and inertial forces of the fluid remain unchanged after scaling, wherein the predetermined scaling rule minimizes an Euler Number error for the three-dimensional grid;
   re-sampling petrophysical properties for adjusted grid cells; and
   when one or more attributes of the static earth model are within a threshold tolerance after said adjusting and re-sampling, using the static earth model as input to a flow simulator.

2. The method of claim 1, wherein the predetermined scaling rule defines at least one of a maximum number of matrix grid cells for the three-dimensional grid and an amount of local grid refinement (LGR) for the three-dimensional grid.

3. The method of claim 1, wherein the predetermined scaling rule defines a degree of static tortuosity for the three-dimensional three-dimensional grid.

4. The method of claim 1, wherein the predetermined scaling rule defines a degree of dynamic tortuosity for the three-dimensional grid.

5. The method of claim 4, wherein the degree of dynamic tortuosity is based on a single-phase flow model.

6. The method of claim 4, wherein the degree of dynamic tortuosity is based on a multi-phase flow model.

7. The method of claim 1, wherein the one or more attributes comprise a connectivity value, a tortuosity value, and an Euler number value.

8. The method of claim 1, further comprising displaying the three-dimensional grid with grid cell scaling result information and property re-sampling result information.

9. A hydrocarbon production control system, comprising:
   a memory having a control program; and
   one or more processors coupled to the memory, wherein the control program, when executed, causes the one or more processors to:
   obtain a static earth model having a three-dimensional grid with multiple cells;
   scaling at least some of the cells based on a predetermined scaling rule in which pressure forces on a fluid and inertial forces of the fluid remain unchanged after scaling, wherein the scaling rule minimizes an Euler Number error for the three-dimensional grid;
   compare a pre-scaled attribute and a post-scaled attribute of the static earth model; and
   when the post-scaled attribute is within a threshold tolerance of the pre-scaled attribute, use the static earth model as input to a flow simulator.

10. The hydrocarbon production control system of claim 9, wherein the predetermined scaling rule defines a maximum amount of scaled cells for the three-dimensional grid or a maximum amount of local grid refinement (LGR) for the three-dimensional grid.

11. The hydrocarbon production control system of claim 9, wherein the predetermined scaling rule defines a static tortuosity distribution limit for the three-dimensional grid based on a pre-scaled tortuosity distribution for the three-dimensional grid.

12. The hydrocarbon production control system of claim 9, wherein the predetermined scaling rule defines a static tortuosity distribution limit for the three-dimensional grid based on pre-scaled tortuosity distribution for the three-dimensional grid that applies deposition facies as a target property for computing tortuosity.

13. The hydrocarbon production control system of claim 9, wherein the predetermined scaling rule defines a dynamic tortuosity distribution limit for the three-dimensional grid based on a pre-scaled tortuosity distribution computed using single-phase flow streamlines.

14. The hydrocarbon production control system of claim 9, wherein the predetermined scaling rule defines a dynamic tortuosity distribution limit for the three-dimensional grid based on a pre-scaled tortuosity distribution computed using multi-phase flow streamlines.

15. The hydrocarbon production control system of claim 9, wherein the predetermined scaling rule defines an Euler Number error threshold for the three-dimensional grid based on a pre-scaled Euler Number criterion.

16. A non-transitory computer-readable medium that stores software, wherein the software, when executed, causes a computer to:
   obtain a static earth model having a three-dimensional grid with multiple cells;
   scaling of at least some of the cells based on a predetermined scaling rule in which pressure forces on a fluid and inertial forces of the fluid remain unchanged after scaling, wherein the scaling rule minimizes an Euler Number error for the three-dimensional grid;
   determine whether a post-scaled attribute of the static earth model complies with a tolerance threshold; and when the post-scaled attribute of the static earth model complies with the tolerance threshold, use the static earth model as input to a flow simulator.

17. The non-transitory computer-readable medium of claim 16, wherein the software, when executed, causes the computer to scale at least some of the cells and their petrophysical properties by applying a predetermined scaling rule that defines a maximum amount of scaled cells for the three-dimensional grid or a maximum amount of local grid refinement (LGR) for the three-dimensional grid.

18. The non-transitory computer-readable medium of claim 16, wherein the software, when executed, causes the computer to scale at least some of the cells and their petrophysical properties by applying at least one of a first scaling rule that verifies a distribution of static tortuosity for the post-scaled static earth model based on a homogeneous model and a pre-scaled static tortuosity distribution and a second scaling rule that that verifies a distribution of dynamic tortuosity for the post-scaled static earth model based on a homogeneous model and a pre-scaled dynamic tortuosity distribution.

19. The non-transitory computer-readable medium of claim 16, wherein the software, when executed, causes the computer to scale at least some of the cells and their petrophysical properties by applying a scaling rule that verifies an Euler number error threshold based on a Euler number computed for geobodies in the post-scaled static earth model and a Euler number computed for the pre-scaled static earth model.

* * * * *

UNITED STATES PATENT AND TRADEMARK OFFICE
CERTIFICATE OF CORRECTION

| | | |
|---|---|---|
| PATENT NO. | : 11,181,662 B2 | Page 1 of 1 |
| APPLICATION NO. | : 14/913983 | |
| DATED | : November 23, 2021 | |
| INVENTOR(S) | : Travis St. George Ramsay | |

It is certified that error appears in the above-identified patent and that said Letters Patent is hereby corrected as shown below:

In the Claims

Column 11, Line 60, Claim 3: the phrase -three-dimensional three-dimensional- should read --three-dimensional--.

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*